United States Patent [19]

Oerlemans et al.

[11] Patent Number: 4,816,995
[45] Date of Patent: Mar. 28, 1989

[54] METHOD FOR DETERMINING WHETHER A SERIES OF END SYMBOLS CAN BE GENERATED BY A CONTEXT-FREE GRAMMAR, A MULTIMODULAR DEVICE FOR THE IMPLEMENTATION OF THE METHOD, AND A TRANSLATION MACHINE COMPRISING SUCH MULTIMODULAR DEVICE

[75] Inventors: Adrianus C. M. Oerlemans; Fransiscus W. Sijstermans, both of Eindhoven, Netherlands

[73] Assignee: U.S. Philips Corporation, New York, N.Y.

[21] Appl. No.: 11,074

[22] Filed: Feb. 5, 1987

[30] Foreign Application Priority Data

Feb. 10, 1986 [NL] Netherlands .............. 8600308

[51] Int. Cl.$^4$ .............................................. G06F 1/00
[52] U.S. Cl. ................................ 364/200; 364/300
[58] Field of Search ... 364/200 MS File, 900 MS File, 364/300

[56] References Cited

U.S. PATENT DOCUMENTS 4,591,980 5/1986 Huberman et al. ............... 364/200

OTHER PUBLICATIONS

Aho et al., the Theory of Parsing, Translation, and Compiling, vol. 1: Parsing, Prentice-Hall 1972, pp. 320–322.

Graham et al., Parsing of General Context-Free Grammars, Advances in Computers, vol. 14, Academic Press, 1976.

Primary Examiner—Raulfe B. Zache
Attorney, Agent, or Firm—Jack D. Slobod

[57] ABSTRACT

A method and a device for determining the permissibility of a series of a1... an end symbols as being derivable by means of a set of production rules on the basis of a context-free grammar G are described. The derivation takes place by assigning dotted rules to elements $T_{i,j}$ ($0 \leq i \leq j \leq n$) (FIG. 1) of a recognition matrix by means of scan, complete and predict operations. The number of operations is of the order of ($n^3$). In a first embodiment ($n+1$) processing modules (FIG. 8) are set up and the successive operations can be limited to a number of the order of ($n^2$). In a second embodiment $\frac{1}{2}(n+1)(n+2)-1$ processing modules are set up and the successive operations can be limited to a number of the order of (n). The method may be applied in a translation machine.

7 Claims, 5 Drawing Sheets $alfa \Rightarrow * a(i+1)..aj$ $S \Rightarrow * gamma A\ delta \wedge gamma \Rightarrow * a_1 .. a_i$ $A \Rightarrow * alfa \cdot beta$ B ⟶ alfa . a beta gamma alfa ⟶ * {a(i+1) .. a(j-1)} alfa a ⟶ * {a(i-1) .. aj}

B ⟶ alfa a beta . gamma

B ⟶ alfa . A beta gamma beta ⟶ * epsilon

A ⟶ {a}

∴ B ⟶ alfa A beta . gamma

SEQUENCE OF SCAN
OF MATRIX
ELEMENTS $Z_{i,i} = \frac{1}{2}(i+1)(i+2);$ $Z_{i,j} = \frac{1}{2}j(j+3)-i; \quad i \neq j$

|   | S0 | S1 | S2 | S3 | S4 | S5 | S6 |
|---|---|---|---|---|---|---|---|
| 1 | 1 P0/S1 | | | | | | |
| | 2 C1/2 S2 | 3 P2/S3 | | | | | |
| 5 | | 4 C3/4 S4 | | | | | |
| | C2/4 5 C1/5 S5 | | P4 | | | | |
| 10 | | | 6 P5/S6 | | | | |
| | C5/7 | C4/7 | 7 C6/7 S7 | P7 | | | |
| 15 | C2/8 9 C1/9 S9 | 8 C3/8 S8 | | P8 | | | |
| | | | | 10 P9/S10 | | | |
| 20 | C9/11 | C6/11 | C7/11 | 11 C10/11 S11 | P11 | | |
| | C5/12 | C4/12 | 12 C6/12 S12 | | P12 | | |
| | C2/13 14 C1/14 S14 | 13 C3/13 S13 | | | P13 | | |
| 25 | | | | | 15 P14/S15 | | |
| 30 | C14/16 | C13/16 | C12/16 | C11/16 17 C10/17 | 16 C15/16 S16 | P16 | |
| | C9/17 | C8/17 | C7/17 | S17 | | P17 | |
| | C5/18 | C4/18 | 18 C6/18 S18 | | | P18 | |
| 35 | C2/19 20 C1/20 S20 | 19 C3/19 S19 | | | | P19 21 P20/S21 | |
| 40 | C20/22 | C19/22 | C18/22 | C17/22 | C16/22 23 C15/23 | 22 C21/22 ... | P22 |
| | C14/23 | C13/23 | C12/23 | C11/23 24 C10/24 | ... | | P23 |
| 45 | C9/24 | C8/24 | C7/24 25 C6/25 | ... | | | P24 |
| | C5/25 | C4/25 26 C3/26 | ... | | | | P25 |
| | C2/26 27 C1/27 | ... | | | | | P26 |
| | ... | | | | | | 28 P27 ... |

FIG. 6

|   | 1 | 3 | 6 | 10 | 15 | 21 | 20 |
|---|---|---|---|---|---|---|---|
| 1 | D1,1<br>S1,2 | D3,3<br>S3,4 | I6,6<br>S6,7 | D10,10<br>S10,11 | D15,15<br>S15,16 | D21,21<br>S21,22 | 20 D25,25 |
| 2 | C1/2,2<br>S2,5 | C3/4,4<br>S4,8 | C6/7,7<br>S7,12 | C10/11,11<br>S11,17 | 16 C15/16,16<br>S16,23 | 22 C21/22,22 | |
| | C2/4,5 | C4/7,8 | C7/11,12 | C11/16,17 | C16/22,23 | | |
| 5 | C1/5,5<br>S5,9 | 8 C3/8,8<br>S6,13 | 12 C6/12,12<br>S12,18 | 17 C10/17,17<br>S17,24 | 23 C15/23,23 | | |
| | S5/7,9 | C8/11,13 | C12/16,18 | C17/22,24 | | C5/12,14 | C12/23,25 |
| | C2/8,9 | C4/12,13 | C7/17,18 | C11/23,24 | | C6/17,19 | |
| 9 | C1/9,9<br>S9,14 | 13 C3/13,13<br>S13,19 | 18 C6/18,18<br>S18,25 | 24 C10/24,24 | | C13/23,26<br>C6/24,26 | C9/24,27 |
| | C9/11,14 | C13/16,19 | C13/22,25 | | C9/17,20 | | |
| | C2/13,14 | C4/18,19 | C7/24,25 | | C5/18,20 | | |
| 14 | C1/14,14<br>S14,20 | 19 C3/19,19<br>S19,26 | 25 C6/25,25 | C14/23,27 | | | |
| | C14/16,20 | C19/22,26 | | C5/25,27 | | | |
| | C2/19,20 | C4/25,26 | | | | | |
| 20 | C1/20,20<br>S20,27 | 26 C3/26,26 | | | | | |
| | C20/22,27 | | | | | | |
| | C2/26,27 | | | | | | |
| 27 | C1/27,27 | | | | | | |

FIG. 7

METHOD FOR DETERMINING WHETHER A SERIES OF END SYMBOLS CAN BE GENERATED BY A CONTEXT-FREE GRAMMAR, A MULTIMODULAR DEVICE FOR THE IMPLEMENTATION OF THE METHOD, AND A TRANSLATION MACHINE COMPRISING SUCH MULTIMODULAR DEVICE

BACKGROUND OF THE INVENTION

The invention relates to a method for determining the permissibility of a series of a1 . . . an end symbols as being derivable by means of a set of production rules on the basis of a pre-determined context-free grammar G, by assigning dotted rules to elements $T_{i,j}$ ($0 \leq i \leq j \leq n$) of a recognition matrix, which dotted rules indicate the derivability of a series of end symbols $a(i+1)$, $a(i+2)$ . . . aj, in which respect the assignment to element $T_{i,j}$ ($i \neq j$) takes place on the basis of dotted rules assigned to element $T_{i,(j-1)}$ by means of a scan operation, and of dotted rules assigned to a first series of element combinations $T_{i,(j-1)}/T_{(j-1),j}$; $T_{i,(j-2)}/T_{(j-2),j}$; . . . ; $T_{i,(i+1)}/T_{(i+1),j}$; $T_{i,i}/T_{i,j}$ by means of respective complete operations, and the assignment to element $T_{j,j}$ on the basis of dotted rules assigned to a second series of elements $(T_{O,j} \ldots T_{(j-1),j})$ by means of respective predict operations. The investigation therefore gives an answer to the question: can the series of elememts be generated by the relevant grammar? Or also: is the relevant series of elements a sentence of the language that can be constructed with the aid of the relevant context-free grammar. In the literature this investigation is known as —Parsing—. As general background references to the technology of parsing the following two books are cited: A. Aho et al., "The Theory of Parsing, Translation and Compiling", Vol. 1: Parsing, Prentice-Hall 1972, or also S. L. Graham et al., "Parsing of General Context-Free Grammars", Advances in Computers, Vol. 14, Academic Press, 1976. However, the present invention does not improve on the theory of parsing per se, but only to the technological realization of such parsing. A test of the above permissibility is a first step before a translation operation can be carried out. The translation may be that between two natural languages, in so far as these are completely context-free, between two artificial languages (for example computer languages) or, with the above-mentioned restriction, between an artificial language and a natural language. Earley's method for carrying out such a test is given on pages 320-322 of the first book cited. This method requires a great many operations and its performance on a sequential computer is very time-consuming. It can be proved that for a series of end symbols consisting of n elements the number of operations is of the order of $(n^3)$. An object of the invention is to structure the performance of this method in such a way that the processing speed can be substantially increased when it is mapped on a multimodular device. In itself, an advantageous structure of a network of processing modules in which the method referred to can be implemented is described in U.S. application Ser. No. 007,155, and incorporated herein by way of reference. In this reference a network of processing modules is described in which at a limited degree G of the network (number of connecting lines per module) the maximum distance between two arbitrary modules (diameter of the network) expressed in the number of communication lines needed for this remains limited between two modules.

SUMMARY OF THE INVENTION

The invention achieves the object because it is characterised in that n+1 processing modules (MO . . . Mn) are provided, all of which are assigned to their own row of elements of the recognition matrix and are provided with column connection facilities for supplying assigned dotted rules to other processing modules, in that the assignment to element $T_{p,j}$ is carried out by processing module Mp ($0 \leq p \leq n$), on the basis of dotted rules assigned by processing modules $\{Mp, M(p+1) \ldots Mj\}$ directly or indirectly, respectively, to elements $T_{k,r}$, in which $k \geq p$ and $r \leq j$, and as a result to the above-mentioned first and second series of elements/element combinations, in that the assignments to a column of elements $T_{x,j}$ ($0 \leq x \leq j$) are carried out together and directly on the basis possible by means of the assignment results present in the respective processing modules Mx, in that the predict operations are carried out in module Mj as soon as the assignments in modules MO . . . $M(j-1)$ are completed, and in that any assignment result determined by processing module Mi for matrix element $T_{i,j}$ is immediately supplied to all the processing modules MO . . . $M(i-1), Mj$.

The inventors have realised that a parallelism increasing in accordance with the value of n can be achieved because, particularly in the complete operations, other combinations of matrix elements are taken as a starting point over and over again. The number of these combinations is of the order of n for each matrix element, and it can be proved that because of the n-fold parallelisation of the operations the total processing time becomes of the order of $(n^2)$, in which respect an acceleration becomes possible, certainly for higher values of n, at the price of a more complicated device/organisation. In particular, the necessary performances of the predict operations constitute another delaying factor because no satisfactory degree of parallelism can be achieved for carrying these out. On close consideration, it proves that although the predict operations admittedly produce a useful limitation in the number of dotted rules assigned as intermediate results, the end result of the algorithm is invariable as regards the effect of the predict operations. For that reason, a further improvement of the method according to the invention is characterised in that the assignation to element $T_{j,j}$ by means of a pseudo-predict operation takes place while disregarding predict operations which were based on assignations to other elements $T_{i,j}$, in that at least $\frac{1}{2}(n+1)(n+2)-1$ processing modules are provided, all of which are assigned to their own element of the recognition matrix and are provided with row connection facilities and column connection facilities in order to supply assigned dotted rules to processing modules with lower values of i and higher values of j, if present, in that an assignation result formed is supplied directly to all the processing modules in the relevant row or column, respectively, in so far as these latter processing modules need the latter assignation result, and in that an operation which can be carried out on the basis of received assignation results is performed unconditionally with respect to processing stages in other processing modules. If possible and necessary, the assignation results are now used for complete operations even if further assignation results must first be obtained at other matrix elements for the ultimate assignation to the relevant matrix element. It can be proved that as a result of this $n^2$-fold parallelisation of the operations the total processing time now becomes of the order of (n), as a result of which a further acceleration of the implementation becomes possible, certainly in the case of higher values of n. It is possible to cause the choice between the three different versions to be controlled each time by the value of n. In the latter case, too, the price of acceleration in processing is again a more complicated device/organisation.

The invention also relates to a multimodular device for the implementation of the method.

When used in a translation machine, first the data structure to be translated is entered into or appropriate storage device. Such data structure usually consists of a sequence of expressions or sentences. For each expression (bounded by certain delimitors, such as a semicolon, a full stop or a carriage return control signal for a printer) the parsing method is executed separately. Thereafter (if the parsing is successful) for each expression a derivation rule as based on the syntax of the input language in question is known. Thereafter, the translation proper is effected in that partial expressions, words, or even the whole expression in the input language are translated into corresponding partial expressions, words, or whole expressions in the output language. In the art, this is known as "syntax driven code generation". Translation between two computer languages (context-free) is often not too difficult. Translation between natural languages is notoriously complicated because the level of correspondences between a source expression and a destination expression jumps between the word level, the partial expression level (e.g. bounded by punctuation such as commas), and the full expression to and fro. Sometimes the level of correspondence is still higher, at a multi-expressions-level. Still more difficult is the situation when a certain expression or word has double meanings. For brevity, the present disclosure does not embark on a discussion on parsing and translation, as a general solution with respect to natural languages will probably never been found. After translation, the sequence of destination expressions is output in a suitable way, e.g. stored or printed. The present invention also relates to a translation machine comprising input means for receiving a sequence of source expressions, a multi-modular device according to the above, a translator for, under control of assigned allowability rules, generating a sequence of destination expressions, and output means for outputting the sequence of destination expressions. Further advantageous aspects are recited in dependent claims.

BRIEF DESCRIPTION OF THE FIGURES

The invention is further explained, partly on the basis of some figures. The explanation first comprises what a context-free grammar is, then the content of the investigation of the permissibility as already mentioned, then the purport of Earley's algorithm, next the modifications to this algorithm and finally the implementation in a multimodular device. In the figures:

FIG. 6 gives a mapping on a multimodular device;

FIG. 7 gives a second mapping on a multimodular device;

WHAT IS A CONTEXT-FREE GRAMMAR?

A context-free grammar consists of two sets of symbols, a start symbol, and a set of production rules, and can thus be written as a 4-tuple G=(N, Sigma, P, S). The symbols are basic elements, for example, characters, letters or mathematical symbols. The definitions of the components of the grammar are as follows:

Sigma is a finite set of end symbols;

N is a finite set of non-end symbols, there are no symbols which form part of both lists N and Sigma;

S is the start symbol and is part of the set N;

P is a finite set of production rules whereby a non-end symbol can be translated into a series of zero or more further symbols, which further symbols all form part of the lists Sigma or N (in the latter case, a next production rule can then again be used for further translation). A production rule such as this can be written as "A→alpha", and in this respect A is a symbol from the list N and alpha is a series of zero or more symbols, each of which forms part of the lists N or Sigma. The context-free aspect of the grammar is determined by the fact that each production rule has only one non-end symbol as its starting point. The start symbol is also permissible as a starting point for the production rules. In principle, it is permissible to derive an increasingly longer series of (other) symbols from a symbol of N by means of repeated application of one or more production rules. If alpha, beta and gamma are each a series of zero or more symbols each from Sigma or N, and B is a symbol from N, and there is a production rule whereby B can be converted into beta, then the series —alpha beta gamma— is "directly derivable" from the series —alpha B gamma—. A series of zero or more implementations of a "direct derivation" (which is permissible in B) is called a "transitive and reflexive closure". A language L(G) which is generated by the grammar G consists of end symbols which, according to the above-mentioned "closure" rule, can be derived from the start symbol. For the sake of brevity, the structure of the production rules and the representation of the various symbols will not be dealt with in detail here.

THE CONTENT OF THE INVESTIGATION OF PERMISSIBILITY

The problem —Parsing— consists of the specification of a program that gives a binary (yes/no) answer to the question of whether a series of symbols W can be generated by the grammar (G), and thus forms an element of the language L(G): b=W IN L(G).

Here G, as stated, is a context-free grammar. W is a series of symbols a1 ... an, while all the ai belong to the list of end symbols. In fact, it means: going from the start symbol S and by (repeated) application of the production rules look for a possible way to generate the current series. A very elementary search method would be to form the sequence a1 ... an by a trial and method in repeatably applying these rules in a tree structure, which is known as "backtracking". But that involves a great deal of searching.

THE EARLEY ALGORITHM

Figure 1:
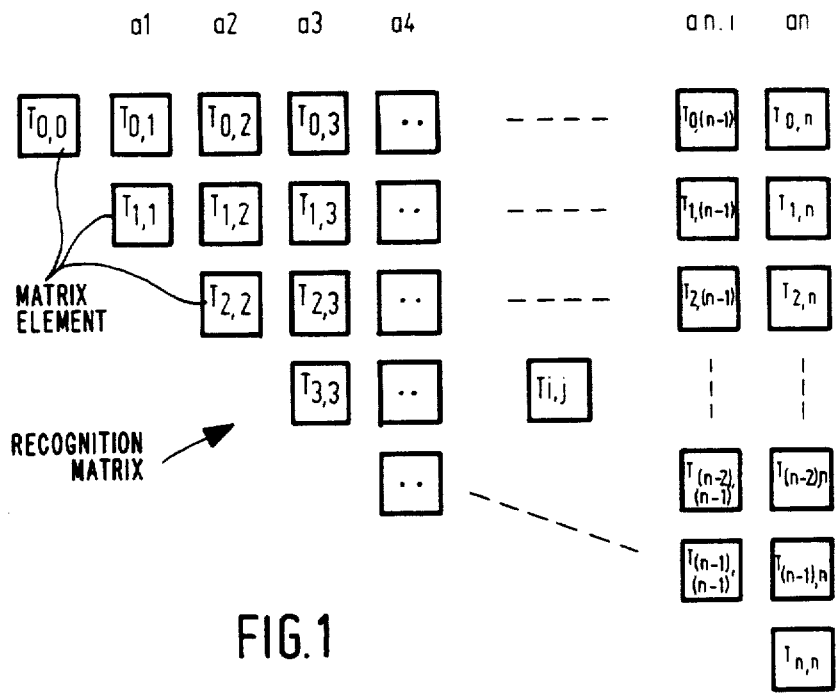
FIG. 1 gives an example of a recognition matrix for Earley's algorithm.
Figure 2:
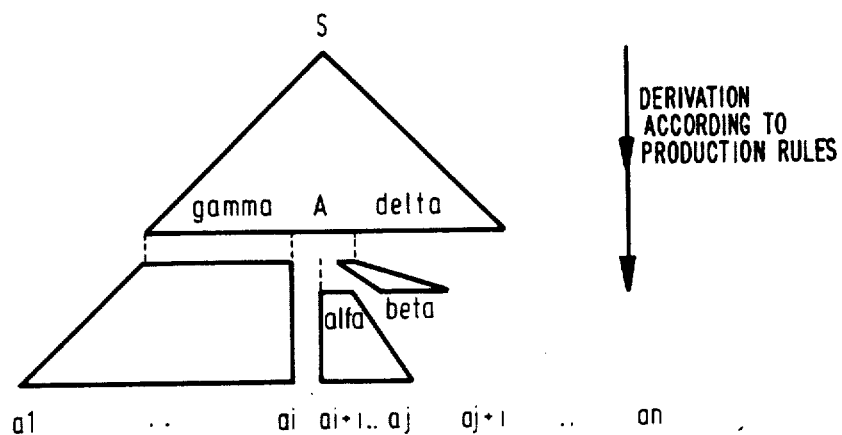
FIG. 2 gives a conceptual clarification of a "dotted rule"

FIG. 1 shows the organisation of a recognition matrix according to Earley's method. After the execution of the method, the elements of the matrix each contain zero or more so-called dotted rules. A dotted rule in matrix element Ti,j indicates that the series of symbols a(i+1) ... aj is permissible in the relevant grammar. At the start of the method all the matrix elements are empty. The recognition matrix for a series of n end symbols to be checked contains $(\frac{1}{2})(n+1)(n+2)$ elements which can be ranked according to a triangle. For all Ti,j we have $0 \leq i \leq j \leq n$. Consideration of the above immediately shows that the matrix can also be oriented in each of the three other possible ways. The definition of a dotted rule is: if —alpha beta— can be directly derived by applying a production rule of the relevant grammar (i.e. the set of production rules P comprises A→alpha beta), then —A→alpha beta— is called a dotted rule. This dotted rule is assigned to the "matrix element" Ti,j if two conditions are satisfied, which are shown in pictorial form in FIG. 2. The first condition is that the series a(i+1) ... aj can be derived directly or indirectly from alpha. The second condition is that the sequence —gamma A delta— can be derived directly or indirectly from the start symbol S and, in addition, the series a1 ... ai is directly or indirectly derivable from gamma. In FIG. 2, the derivability is indicated by a trapezium in each case. It proves that no relevance can be attached to the series of elements which can be derived from beta and delta. This is indicated by the position of the dot in the expression for the dotted rule: as regards what comes after the arrow but before the dot, it is known that it can derive a "part" of the series of symbols a1 ... an. The expression after the dot must then be further considered (N.B. the "part" of the series can also imply an empty sub-series).

This definition leads to the following. If a dotted rule of the form "S→alpha.", is assigned to the element T0,n, then the series of end symbols a1 ... an can be derived directly or indirectly from the start symbol S. Hence the series of end symbols a1 ... an forms a permissible part of L(G). It is also pointed out that each element Ti,j zero, can contain one or more dotted rules. "Zero" means that no derivation of the series a1 ... an would run along it. "One or more" means that a derivation of the series a1 ... an can, in fact, run along it. If this number is greater than one, it will generally turn out during the further implementation of the method that only one dotted rule remains because it is found that paths of which other dotted rules form part come to a dead end. If it proves that matrix element T0,n contains two or more dotted rules of the form "S→alpha." at the end of the implementation, this means that the grammar is ambiguous. This is generally undesirable, but it has no relation to the invention and is not further considered here.

THE THREE OPERATIONS ACCORDING TO EARLEY

Figures 3, 4:
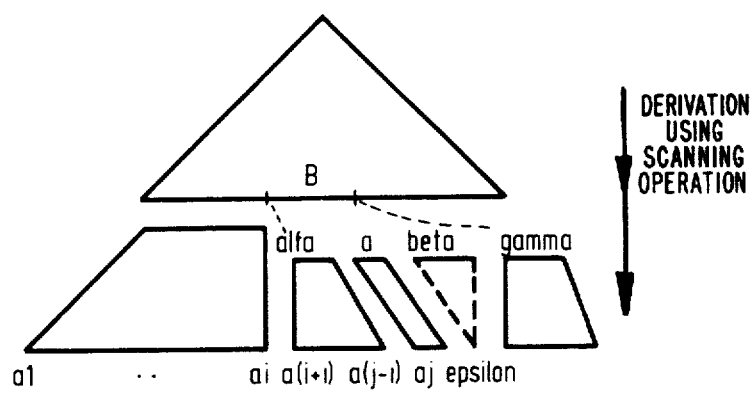
FIG. 3 gives a conceptual clarification of the "scan" operation according to Earley.
FIG. 4 gives a conceptual clarification of the "complete" operation according to Earley.

First of all, the method comprises the scan operation. This is explained in pictorial form on the basis of FIG. 3. Now let us assume that a dotted rule is assigned to element Ti,(j−1) of the recognition matrix which indicates that —alpha.a beta gamma—, can be directly derived from B, in which respect a is the end symbol aj and epsilon can be derived directly or indirectly from beta. Here epsilon is a series of zero symbols. Then the dotted rule —B→alpha a beta.gamma— may be assigned to the directly adjacent element Ti,j. In this way the dot is therefore moved to the right over one end symbol position (aj). For the performance of this operation it is only necessary for the assignation of dotted rule(s) to the immediately adjacent element Ti,(j−1) to be known. In addition, for each dotted rule in element Ti,(j−1) this operation may, or may not produce its own dotted rule in element Ti,j.

The method also comprises the "complete" operation. In general terms, the object of the method is to place in the element Ti,j the dotted rule which generates the series of end symbols a(i+1) ... aj. Now let use assume that in element Ti,k there is a dotted rule which generates a series of end symbols a(i+1) ... ak; and in element $T_{k,j}$ a rule which generates the series of end elements a(k+1) ... aj ($i \leq k \leq j$). Here, k can therefore possess one (or more) of a series of values. The question now arises whether the two last-mentioned dotted rules can be combined. This question is answered as follows (see FIG. 4): Assume that the dotted rule B→alpha.A beta gamma is assigned to Ti,k and, in addition, the series epsilon (empty series) can be derived directly or indirectly from beta, and assume that a dotted rule which indicates that a series of exclusively end elements can be derived directly or indirectly from A, then to the element Ti,j there may be assigned the dotted rule which gives the direct derivation: B→alpha A beta.gamma. Here too, therefore, it proves that the object of the method can be summarized as the attempt to move the dot further and further to the right. To this end, for the assignation to element Ti,j the information from the following pairs of elements (and in sequence from the top downwards) must be combined:

| | | |
|---|---|---|
| Ti,(j−1) | and | T(j−1),j |
| Ti,(j−2) | and | T(j−2),j |
| Ti,(j−3) | and | T(j−3),j |
| . | | . |
| . | | . |
| . | | . |
| Ti,(i+1) | and | T(i+1),j |
| Ti,i | and | Ti,j |

Pair-wise, therefore, these are always a matrix element on the same row and a matrix element in the same column as matrix element Ti,j, until finally both matrix elements in the pair are located on the same row of the matrix. The matrix element Tj,j makes no contribution to the "complete" operation.

The method further comprises the "predict" operation. Let us assume that any element Ti,j, (i=0,1 ... (j−1)) contains a dotted rule —B→gamma.C delta—. This means that the series of end symbols a1 ... aj can be derived directly or indirectly from gamma. It can now be proved that element Tj,j (the bottom element in the relevant column) contains all the dotted rules —A→alpha.beta— to which the following applies: the empty series of epsilon end symbols can be derived directly or indirectly from alpha and, in addition, A is an element of the first set of C. In addition, element Tj,j cannot contain any more dotted rules. For this predict operation it is therefore necessary to assign all the matrix elements T0,j, T1,j ... T(j−1),j which are located in the same column.

Figure 5:
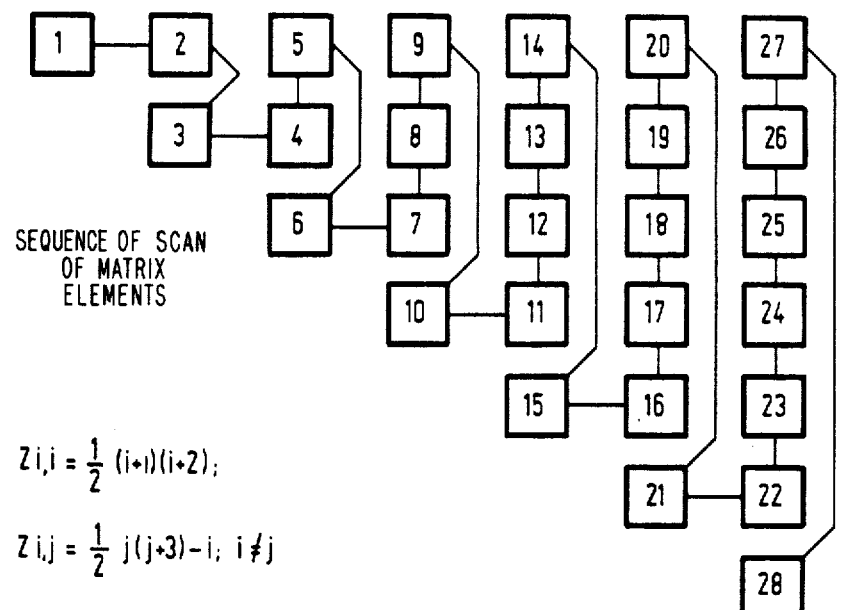
FIG. 5 gives an indication of the sequence of the operations in the algorithm.

FIG. 5 gives an indication of the sequence of the operations in the method when one single processing module is present. The matrix elements are now only provided with a consecutive number 1 ... 28 and are represented as connected into a chain. The mapping on Ti,j is a one-to-one correspondence. First, the assignation to element 1 (T0,0) is determined in FIG. 5. This works as a predict operation on the start symbol S. Then the element 1 is ready (notation PS). Then the assignation to element 2 is determined, first with the scan operation relating to element 1 (notation S1) and then the complete operation on the pair of elements 1,2 (notation C1/2). Then element 2 is ready. Then the assignation to element 3 is determined with only the predict operation on element 2 (notation P2). Then element 3 is ready. Then the assignation to element 4 is determined, first with the scan operation on element 3 (notation S3) and then the complete operation on the pair of elements 3,4 (notation C3/4). Then element 4 is ready. Then the assignation to element 5 is determined, first with the scan operation over element 2 (S2), then the complete operation over the pair of elements 2,4 (notation C2/4) and finally over the pair of elements 1,5 (notation C1/5). Then element 5 is ready. Then the assignation to element 6 is determined with the predict operation over the elements 5 and 4 (P4, P5). The sequence of performance between these is arbitrary. Then element 6 is ready. Then the assignation to element 7 is determined, first with the scan operation over element 6 (S6) and then the complete operation over the pair of elements 6,7 (C6/7). Then element 7 is ready. Then the assignation to element 8 is determined, first with the scan operation over element 4 (S4), then the complete operation over the pair of elements 4,7 (C4/7) and finally the complete operation over the pair of elements 3,8 (C3/8). Then element 8 is ready. Then the assignation to element 9 is determined, first with the scan operation over element 5 (S5), then in succession the complete operations over the pairs of elements 5/7, 2/8, 1/9, (C5/7, C2/8, C1/9). Then element 9 is ready. Then the assignation to element 10 is determined with the predict operation (in arbitrary sequence) over the elements 9, 8 and 7 (P9, P8, P7). After that all the elements in the first four columns are ready. The operations for the further columns proceed in a corresponding manner. For a series of n end symbols there are $\frac{1}{2}*(n+1)*(n+2)$ elements. The number of operations per element varies from 1 (element 1) to $j+1$ for the elements $T(j-1),j$; $T(j-2),j$ ... To,j, respectively. For a series of n end symbols the number of operations is therefore of the order of ($n^3$). In a single sequential machine the sequence is therefore as indicated. In this respect, each matrix element Ti,j is given a consecutive number Z and they are processed in the sequence of their consecutive numbers. The figure gives another expression for the consecutive number as a function of the indices i,j.

FIRST EXAMPLE OF AN EMBODIMENT OF A MAPPING ON A MULTIMODULAR DEVICE

FIG. 6 gives the mapping of this method on a multimodular device in which each row of matrix elements has its own processing module which determines the assignations to the various matrix elements of this row. The operations are designated as already discussed; in every case, each operation can only take place when the necessary input data have been acquired. Sometimes the sequence can be chosen. The indices of the operations indicate the modules of which the end results, whether provisional or otherwise, have been used. It is assumed that the transmission of end results between the processing modules is instantaneous. When an element of the recognition matrix has been completed, this is indicated by a horizontal dashed line accompanied by the consecutive number of the relevant matrix number. The chart is drawn up according to the principle that each operation must be carried out "as soon as possible". At that moment the assignation results which are needed for this operation must therefore be available in the relevant processing module. This means that as far as necessary the assignation results must be communicated directly to these processing modules, in other words, in such a way that the latter do not have to wait unnecessarily. Now, however, the operations P16–P19 can also be carried out later, for example on lines 32, 33, 34, and 35 respectively, and the operations S17, C17/27 can also be carried out on lines 39 and 40, respectively. The assignation result for module 8 is obtained, for example, on line 13. This is used in the other modules: module MO for the first time on line 14, module M3 also on line 14, modules M2, M4, M5 and M6 unused. The communication to the last-mentioned modules can be omitted, if required. Corresponding requirements apply to the other modules. Generally speaking, assignation results must be communicated to all the processing modules which relate to lower row numbers (for the subsequent performance of complete operations) and to the processing module relating to the lowest matrix element of the relevant column of matrix elements (for the subsequent performance of the relevant predict operations). The scan operations use only assignation results which are generated in the relevant processing module itself. The number of lines for $n+1$ columns (n end symbols) is equal to $(n+1)^2$, hence the total processing time is of the order of $n^2$. The above does not mean that all the lines take the same amount of time. This depends on the number of dotted rules which are used as start results in the relevant processing module, on the structure of the grammar, and so on. The statement about the processing time therefore only indicates an order of magnitude. The total number of operations for six end symbols is equal to 99 and the acceleration here is therefore approximately a factor of 2. In spite of this the utilization of capacity is low and in column MO does not even reach 60%. Another important characteristic in the above is that the content of element Ti,j of the recognition matrix never depends on the content of any element Tk,(j+p), in which $p>0$ and k is permissible. The processing modules referred to above can be realized in various ways on a device. In the first place, each processing module can be realized as a particular subdevice. On the other hand, it is also possible for this mapping to be combined programmatically for a series of matrix elements be done to a particular single subdevice. The processing then becomes slower by as much as is needed for controlling the information transports associated with this more flexible mapping. For example, the operations summarised for module M5 can also be carried out on lines 29–38 by module M4, and the operations summarised for module M6 can be carried out on lines 41–49 by module M4. Further projections can be read off from the figure. In particular, if there is a large number of processing modules, so that long series of end symbols can be processed, it is possible to limit the equipment at the expense of only a slightly longer processing time: this is then still of the order of ($n^2$).

SECOND EXAMPLE OF AN EMBODIMENT OF A MAPPING ON A MULTIMODULAR DEVICE

Next, a second method is discussed for mapping the Earley method on a multimodular device.

Here, the method is changed slightly. In the unchanged form no acceleration is possible above the chart presented in FIG. 6: each line in this contains at least one operation which cannot take place before at least one operation has been carried out in the immediately preceding line, and the same applies to the latter operation.

The Earley method states that: matrix element $T_{i,j}$ contains the dotted rule —A→alpha.beta— if, and only if, the following applies:

a. the series of end symbols $a(i+1) \ldots aj$ can be derived from alpha; and b. —gamma A delta— can be derived from start symbol S, in which respect the series of end symbols $a1 \ldots ai$ can be derived from gamma.

The change in the method relates to the omission of condition b. The consequences are:

1. More dotted rules can be assigned for all the matrix elements than was possible with the original method; these each then form part of respective dead-end paths.

2. All the predict operations are eliminated, so that the assignations to the diagonal elements $T_{j,j}$ can be carried out directly. The saving in work is illusory, however, because the effect mentioned in point 1 carries much more weight. The assignation to element $T_{j,j}$ is noted as D1,3,6,10 . . . according to the numbering in FIG. 5, and is further referred to here as a pseudo-predict operation since only the locally available information is used for this purpose.

3. If a complete operation can be performed, this is carried out immediately.

A dotted rule —S→alpha.— is now assigned to matrix element $T0,n$ (if necessary), while the series of end elements $a1 \ldots an$ can be derived from alpha. It follows from this that the assignation to matrix element $T0,n$ is invariant for the above-mentioned modification of the method.

Each matrix element (series 1 . . . 28 in FIG. 5) is now provided with its own processing module. If necessary, this can be omitted for matrix element 28 because the result of the relevant pseudo-predict operation is not used anywhere. FIG. 7 indicates the sequence of the operations. The notation is as in the earlier FIG. 6, while as the last index it is indicated for which matrix element the operation is intended, and hence also which processing module carries out the relevant processing operation. For example, C13/16,19 means the complete operation on the basis of the assignation results in matrix elements 13 and 16, and carried out in and by module 19. The first line indicates that the assignation is carried out for the matrix elements $T_{j,j}$ by means of the pseudo-predict operation. These are then ready. The second line indicates that the assignation results for the matrix elements are used for a scan operation and on the third line for a complete operation. The fourth line indicates a further scan operation and so on.

The operations for one or more matrix elements are always completed on the first, third, sixth, tenth, fourteenth, eighteenth and twenty-second lines. These results are then supplied to the relevant modules as quickly as possible, but in any event before the relevant modules need this information. In the diagram in FIG. 5 this means communication in the direction of lower row numbers and higher column numbers; for the diagonal elements $T_{i,i}$, however, communication is only in the direction of higher column numbers.

Up to and including the twelfth line of the first column (C9/11,14) the sequence of operations is identical to that in FIG. 6 and consequently no acceleration is obtained. The next operation in this column in FIG. 6 is C5/12,14. From the diagram in FIG. 8 it can be seen that this operation, however, can already be carried out immediately after the sixth line because then the assignations to elements 5 and 12 have already been completed. The same applies to the complete operations C8/17,19 and C12/23,25. These can be carried out at will on the seventh to the tenth line inclusive. If required, a maximum of up to seven processing modules can then be active simultaneously. As a result, lines eleven to fourteen inclusive are sufficient for the ultimate assignation to the elements 14, 19 and 25. The matrix elements 20 and 26 each require six operations. Four of these are carried out on lines fifteen to eighteen inclusive and in every case two on one of the lines eleven to fourteen inclusive selected arbitrarily. Modules 20 and 26 must each carry out two operations on these four lines. Matrix element 27 requires seven operations. Of these, four are carried out on lines nineteen to twenty-two inclusive, two on lines fifteen to eighteen inclusive, and one on lines eleven to fourteen inclusive.

It can be proved that:

(a) for each increase in n by one unit above the value $n=2$ (six matrix elements) the first column of FIG. 7 contains only four extra lines;

(b) the number of advance operations which therefore take place earlier than corresponds to the time in FIG. 6 is at most two operations for each module for every four extra lines as stated in (a).

It is further pointed out that it is also assumed in FIG. 7 that all the separate operations require the same amount of time. In practice, this will not be the case. If the results of an assignation, hence an assigned dotted rule, are transmitted immediately to further modules for use, a further acceleration can occur which may be considerable. This acceleration cannot, however, be given in the notations in FIGS. 6 and 7 because it is not known a priori where such an acceleration can take place. For example, an assignation of zero dotted rules in element 8 may mean that operations S8,13; C8/11; C2/8,9; C8/17,19; C8/24,26 do not produce any further assignation. In particular, the first three of these form part of a critical path, so that omitting them, if required, can immediately imply an acceleration. It therefore proves that the number of lines increases linearly by n, and hence the total processing time is also of the order of (n).

The statement made at FIG. 6 with regard to the mapping of processing modules on sub-devices also applies here: a saving on components can be obtained by using sub-devices for various processing modules. In practice it has been found that, particularly for successive operations with changing values of n, a very complicated selection and control diagram is then necessary.

It has also been found that for small values of n the mapping on one single processing module according to the state of the art is frequently the most advantageous. For an intermediate range of values for n it often proves that the set-up according to FIG. 6 is the most advantageous. For large values of n the set-up according to FIG. 7 is the most favourable. For that reason, when sufficient processing modules are available, if n is in the low range the known method is used, for n in the intermediate range the method according to 6 is used, and if possible, for the range of large values of n the method according to FIG. 7 is used. The value of n is always communicated to all the processing modules which select their own working mode under its control.

DESCRIPTION OF A SUB-DEVICE ON WHICH A PROCESSING MODULE IS MAPPED

Figure 8:
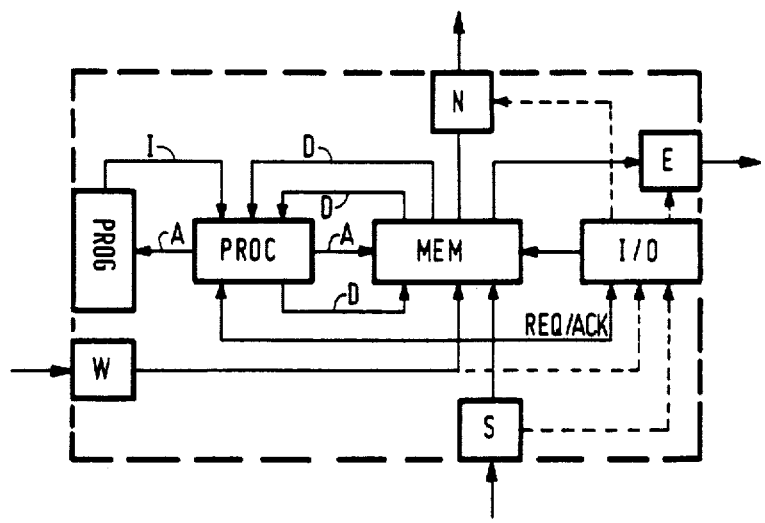
FIG. 8 gives a block diagram of a processing module.

FIG. 8 shows an elementary block diagram of a sub-device, or module. This contains two input elements W(west) and S(south) in order to receive information relating to assigned dotted rules from modules located on the left in the matrix or modules located lower within the matrix. In addition, the module may send information on assigned dotted rules to modules located higher in the matrix or modules located to the right in the matrix, respectively. Furthermore, there is an input/-output control element I/O, a memory MEM, a processor PROC and a program memory PROG. The specific operation of such a module down to the instruction level is not treated further for brevity. Each module has available the end element aj (which can be supplied in the same way as the information of the dotted rules, or in some other way) and its own ordinal number i (and j, if applicable). Information received on dotted rules assigned is stored, provided with the related ordinal numbers i,j, in the memory MEM with addressing by an I/O control element, which for this purpose is activated via the dashed lines from elements W and S. If a dotted rule is received, element I/O transmits an activation signal via the control line REQ/ACK to the processor PROC. This addresses in memory MEM the dotted rule received latest and, in so far as a complete operation to be carried out is concerned, all the other dotted rules in MEM of which the index numbers are relevant. The dotted rules are received in element PROC and the production rules in the program memory PROG are scanned in succession in order to detect whether a new dotted rule can be assigned from this. When all the production rules have been interrogated, or earlier if a new dotted rule has been found, a "ready" signal is sent over line REQ/ACK to the I/O element. In the event of a NO assignation a following dotted rule which may have arrived in memory MEM is then investigated. In the event of a positive assignation, the relevant dotted rule is supplied under the control of element I/O via memory MEM to the output elements N(north) and E(east) and from there to further modules, if present. Control signals to this effect are outputted from element I/O to elements N, E along dashed lines. For the sake of simplicity, no handshake mechanisms between the various modules have beenshown. In addition, those dotted rules received, which may be relevant for further modules are sent immediately from elements W and/or S, via memory MEM to elements N and/or E. In the same way, the results of the pseudo-predict operations are transmitted via the element E and scan operations are performed on assignation results which arrive via the element W. Various interconnections have been shown between elements PROC and PROG for addresses (A) and instructions (I) and between elements PROC and MEM for addresses (A) and data (D), respectively. A double-read capability for the memory may increase data throughput.

The module described is suitable for incorporation in an organisation according to FIG. 7. In this respect, unused connections are not activated. The module for matrix element T0,n has a connection to the outside world in order to signal the ultimate permissibility.

The following changes must be provided for the purpose of the organisation in FIG. 6:

(a) the connection elements W and E need not be active because only one column of modules is present (b) connection element N operates bi-directionally in order, respectively, to receive the predict information and to transmit the complete information (c) the same applies to connection element S.

When the selection is taking place, for example, between the organisation in FIGS. 6 and 7, respectively, one column of modules is activated (FIG. 6) and the other is set to non-active, or all are activated, respectively (FIG. 7).

What is claimed is:

1. A method for determining whether a series of $a_i \ldots a_n$ end symbols can be generated by a context free grammar G by assigning dotted rules to the elements $T_{i,j}$ ($0 \leq i \leq j \leq n$) arranged as a plurality of rows and columns of a recognition matrix comprising n+1 processing modules $M_0 \ldots M_n$ each module assigned to a row of said recognition matrix comprising the steps of:

communicating assigned dotted rules among said processing modules;

assigning a dotted rule to an element $T_{p,j}$ in a processor $M_p$ ($0 \leq p \leq n$) based on:
  (a) dotted rules assigned to elements $T_{k,r}$ ($k \geq p$ and $r \leq j$) by modules $M_p, M_{(p+1)} \ldots M_j$;
  (b) dotted rules assigned to a first series of element combinations $T_{i,(j-1)}/T_{(j-1),j}, T_{i,(j-2)}/T_{(j-2),j}, \ldots ; T_{i,(i+1)}/T_{(i+1),j}, T_{i,i}/T_{i,j}$ by means of respective complete operations; and
  (c) dotted rules assigned to a second series of elements $T_{0,j} \ldots T_{(j-1),j}$ by means of respective predict operations;

assigning dotted rules to a column of elements $T_{x,j}$ ($0 \leq x \leq j$) of said matrix, together and directly based on dotted rules assigned by a processing module $M_x$;

carrying out a predict operation in a module $M_j$ as soon as modules $M_0 \ldots M_{(j-1)}$ have completed assignments; and immediately communicating a dotted rule assigned to an element $T_{i,j}$ to all preceding processing modules $M_0 \ldots M_{(i-1)}, M_j$.

2. A method for determining whether a series of $a_i \ldots a_n$ end symbols can be generated by a context free grammar G by assigning dotted rules to the elements $T_{i,j}$ ($0 \leq i \leq j \leq n$) of a recognition matrix, each of said dotted rules indicating whether a series of end symbols $a_{(i+1)}, a_{(i+2)} \ldots a_j$ can be derived according to said grammar G, said matrix comprising at least $\frac{1}{2}(n+1)(n+2)-1$ processing modules arranged in a plurality of rows and columns, each module assigned to an element of said recognition matrix:

communicating assigned dotted rules among said processing modules in a row and a column;

unconditionally assigning a dotted rule to an element $T_{i,j}$ ($i \neq j$) based on:
  (a) dotted rules assigned to an element $T_{i(j-1)}$ by means of a scan operation; and
  (b) dotted rules assigned to a first series of element combinations $T_{i,(j-1)}/T_{(j-1),j}, T_{i,(j-2)}T_{(j-2),j}, \ldots ; T_{i,(i+1)}/T_{(i+1),j}, T_{i,i}/T_{i,j}$ by means of respective complete operations;

assigning a dotted rule to an element $T_{j,j}$ by means of a pseudo predict operation while disregarding any predict operation based on a dotted rule assigned to any element $T_{i,j}$; and communicating a dotted rule assigned to element $T_{i,j}$ to all processing modules with a lower value of i and a higher value of j.

3. A device for determining whether a series of $a_1 \ldots a_n$ end symbols can be generated by a predetermined context-free grammar G, by assigning dotted rules to elements $T_{i,j}(0 \leq i \leq j \leq n)$ of a recognition matrix, which dotted rules indicate whether a series of end symbols $a_{(i+1)}, a_{(i+2)} \ldots a_j$ is derivable by said grammar, in which assigning a dotted rule to an element $T_{i,j}$ $(i \neq j)$ takes place on the basis of dotted rules assigned to element $T_{i,(j-1)}$ by a scan operation, and on the basis of dotted rules assigned to a first series of element combinations $T_{i,(j-1)}/T_{(j-1),j}$; $T_{i,(j-2)}/T_{(j-2),j}; \ldots ; T_{i,(i+1),}/T_{(i+1),j}$; $T_{i,i}/T_{i,j}$ by a plurality of complete operations, and assigning dotted rules to element $T_{j,j}$ is based on dotted rules assigned to a second series of elements $T_{0,j} \ldots T_{(j-1),j}$ by a plurality of predict operations, comprising:

n+1 processing modules ($M_0 \ldots M_n$), each processing module assigned to a row of elements of said recognition matrix;

column connection facilities interconnecting selected processing modules for communicating assigned dotted rules among said selected processing modules, wherein a processing module $M_p$ assigns a dotted rule to an element $T_{p,j}$ ($0 \leq p \leq n$), on the basis of:

(a) dotted rules $M_p, M_{(p+1)} \ldots M_j$ assigned to elements $T_{k,r}$ ($K \geq p, r \leq j$) by processing modules $M_p, M_{(p+1)} \ldots M_j$ directly or indirectly, respectively; and (b) dotted rules assigned to said first and second series of elements/element combinations;

wherein assignment of dotted rules to a column of elements $T_{x,j}$ ($0 \leq x \leq j$) is carried out together and directly based on dotted rules assigned by processing modules $M_x$, and wherein module $M_j$ carries out predict operations as soon as modules $M_0 \ldots M_{(j-1)}$ have assigned dotted rules, and means for communicating a dotted rule assigned by a processing module $M_i$ for a matrix element $T_{i,j}$ to all processing modules $M_0 \ldots M_{(i-1)}, M_j$, and interconnection network means for bidirectionally interconnecting processing modules $M_0 \ldots M_n$;

reception means in each processing module $M_i$($0 \leq i \leq n$) for receiving said end symbols;

program memory means for storing a test program;

means responsive to said test program for assigning a dotted rule to the series of elements in the recognition matrix $T_{i,i} \ldots T_{i,j}$, and connection means for receiving assigned dotted rules from processing modules $M_{(i+1)} \ldots M_n$ relating to elements $T_{(i+1),x}; T_{(i+2),x} \ldots T_{x,x}$ ($i \leq x \leq n$), in so far as present, for performing complete operations and for receiving dotted rules from processing modules $M_0 \ldots M_{(i-1)}$ for performing predict operations, and for communicating dotted rules to processing modules $M_0 \ldots M_{(i-1)}$ and processing modules $M_{(i+1)} \ldots M_n$ for performing complete operations and predict operations respectively as soon as said means responsive to said test program has assigned dotted rules to said series of elements.

4. A device for determining whether a series of $a_1 \ldots a_n$ end symbols can be derived by a set of production rules on the basis of a predetermined context free grammar G by assigning dotted rules to a recognition matrix having elements $T_{i,j}$ ($0 \leq i \leq j \leq n$) said dotted rules indicating whether a series of end symbols $a_{(i+1)} a_{(i+2)} \ldots a_j$ can be derived on the basis of said grammar G by assigning a dotted rule to element $T_{i,j}$ ($i \neq j$) on the basis of dotted rules assigned to element $T_{i,(j-1)}$ by a scan operation and based on dotted rules assigned to a first series of element combinations $T_{i,(j-1)}/T_{(j-1),j}$; $T_{i,(j-2)}T_{(j-2),j}, \ldots ; T_{i,(i+1)}/T_{(i+1),j}; T_{i,i}/T_{i,j}$ by means of a plurality of complete operations in which a dotted rule is assigned to an element $T_{j,j}$ by a pseudo-predict operation while disregarding predict operations based on assignment of dotted rules to other elements $T_{i,j}$ comprising:

at least $\frac{1}{2}(n+1)(n+2)-1$ processing modules each assigned to an element of said recognition matrix;

communication means for communicating dotted rules assigned by a processing module to two processing modules with lower values of i and higher values of j;

means for communicating dotted rules directly among all processing modules in a row or column to carry out said scan, predict, and pseudo-predict operations;

wherein said processors assign said dotted rules unconditionally on the basis of dotted rules received from other processors;

interconnection network means for bi-directionally connecting all processing modules $M_{i,j}$; and wherein each processing module comprises:

a. reception means for receiving said end symbols;

b. program memory means for storing a test program;

c. processing means for assigning dotted rules to a matrix element $T_{i,j}$ under control of said test program;

d. first connection means for receiving dotted rules from modules $M_{i,x}$ ($i \leq x \leq j$);

e. second connection means for receiving dotted rules assigned by modules $M_{y,i}$ ($i \leq y \leq j$);

f. third connection means for immediately transmitting dotted rules to modules $M_{i,z}$ ($j \leq z \leq n$); and g. fourth connection means for immediately transmitting dotted rules to modules $M_{w,j}$ ($0 \leq w \leq i$).

5. A device according to claim 4, comprising switching means for deactivating all processing modules, except a column of n+1 processing modules and then to cause the processing to take place only in said column of n+1 processing modules.

6. A translation machine comprising:

input means for receiving a sequence of source expressions; storage means connected to said input means;

a plurality of processors connected to said storage means for testing whether a series of end $a, \ldots$ an symbols can be generated by a context free grammar G by assigning dotted rules to the elements $T_{i,j}$ ($0 \leq i \leq j \leq n$) arranged as a plurality of rows and columns of a recognition matrix comprising n+1 processing modules $M_0 \ldots M_n$ each module assigned to a row of said recognition matrix;

a translator connected to processors and said storage means for receiving a source of expression and generating a syntax driven code for said source expression based on a dotted rule assigned to said source expression, and output means connected to said translator for outputting a destination expression.

7. A translation machine comprising:

input means for receiving a sequence of source expressions;

storage means connected to said input means;

a plurality of processors connected to said storage means for testing whether a series of end symbols can be generated by a context free grammar G by assigning dotted rules to the elements $T_{i,j}$ ($0 \leq i \leq j \leq n$) of a recognition matrix, each of said dotted rules indicating whether a series of end symbols $a_{(i+1)}, a_{(i+2)} \ldots a_j$ can be derived according to said grammar G, said matrix comprising at least $\frac{1}{2}(n+1)(n+2)-1$ processing modules arranged in a plurality of rows and columns, each module assigned to an element of said recognition matrix;

a translator connected to processors and said storage means for receiving a source of expression and generating a syntax driven code for said source expression based on a dotted rule assigned to said source expression, and output means connected to said translator for outputting a destination expression.

* * * * *